INVENTOR.
Robert P. Benzinger
BY
L. D. Burch
ATTORNEY

United States Patent Office 2,974,652
Patented Mar. 14, 1961

2,974,652
VENTING SYSTEMS FOR INTERNAL COMBUSTION ENGINES

Robert P. Benzinger, Clawson, Mich., assignor to General Motors Corporation, Detroit, Mich., a corporation of Delaware Filed Sept. 25, 1959, Ser. No. 842,416

5 Claims. (Cl. 123—41.86)

This invention relates to venting systems for internal combustion engines, particularly for internal combustion engines for automotive and other purposes.

It is proposed to construct a large cavity above the crankcase of an engine and to provide a separator and a large settling chamber in the cavity so provided. The separator and the cavity are in series so that the vaporous substances from the crankcase go first through the separator and then to the settling chamber. Both the separator and the settling chamber are provided with openings by which the separated oil will return to the crankcase. With this construction it is possible to greatly reduce and even eliminate the necessity of having air ordinarily circulated through the crankcase of an engine acting as a carrying medium for rapidly exhausting the vaporous substances from the engine. This previously has been considered necessary because of the tendency of the vaporous substances to condense on the cold walls of the crankcase during the starting of the engine, thereby producing acid substances that injure both the working parts and the frame parts of the engine. In an air cooled engine in which the crankcase and other casing parts of the engine are made of aluminum or other similar light metal, it is possible to rapidly heat the parts of the engine previously tending to condense the vaporous substances. With such construction and in an engine embodying the separator and separating chamber employed, it is possible to greatly decrease or even eliminate the circulating air.

In the drawings:

Figure 2 is taken substantially in the plane of line 2—2 on Figure 1 looking in the direction of the arrows.

Figure 3 is taken substantially in the plane of line 3—3 on Figure 1 looking in the direction of the arrows.

Figure 1:
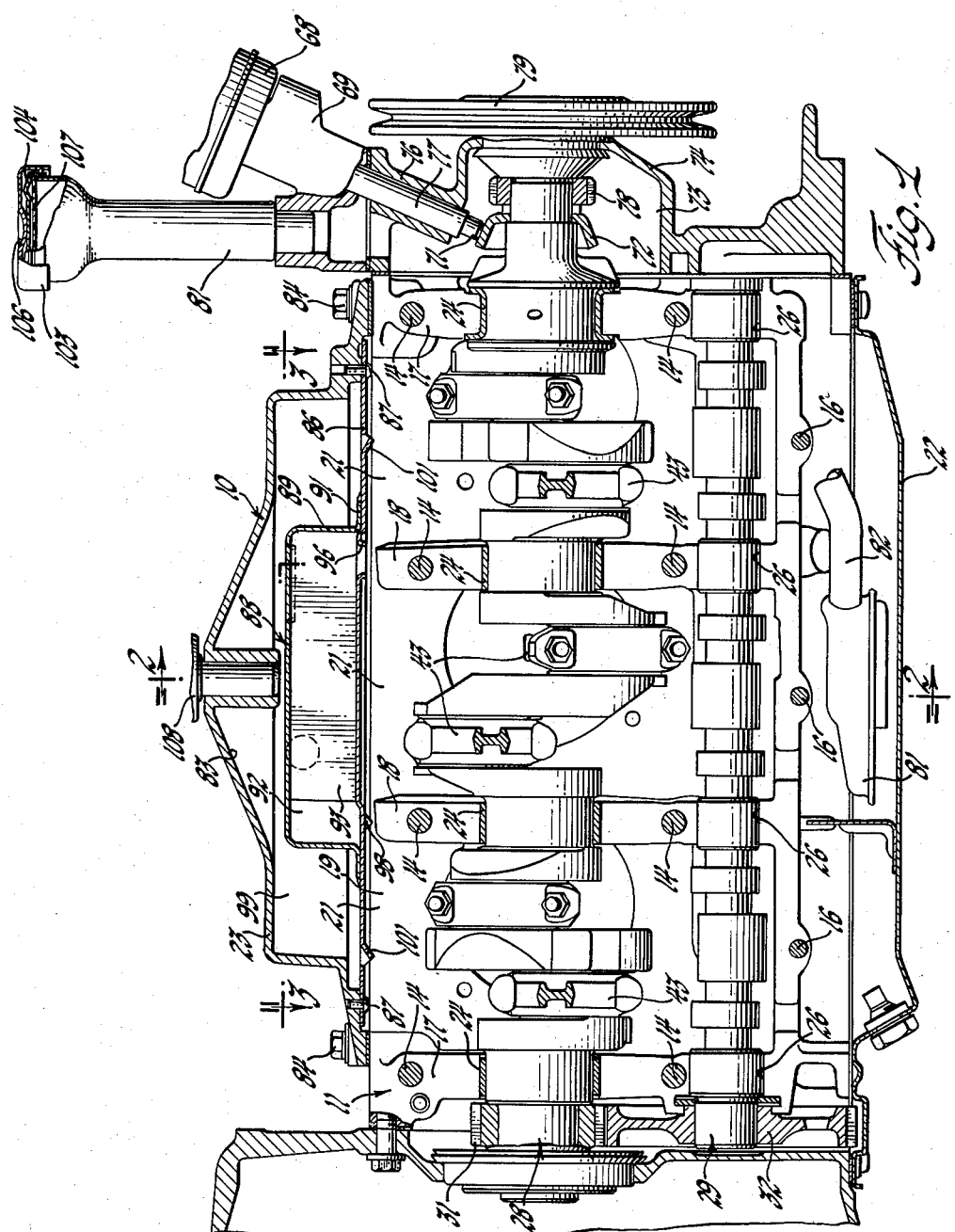
Figure 1 is a longitudinal section view through a 180° opposed six cylinder engine having an inner compartment venting system embodying the invention.
Figure 2:
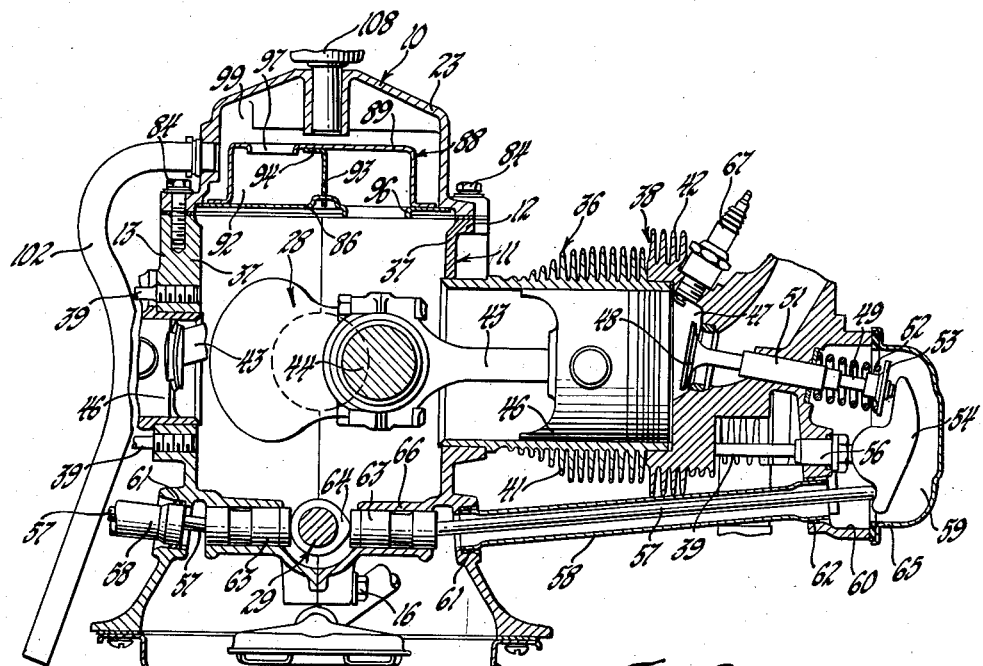
Figure 2 is a fragmentary cross-sectional view of the engine illustrated by Figure 1.
Figure 3:
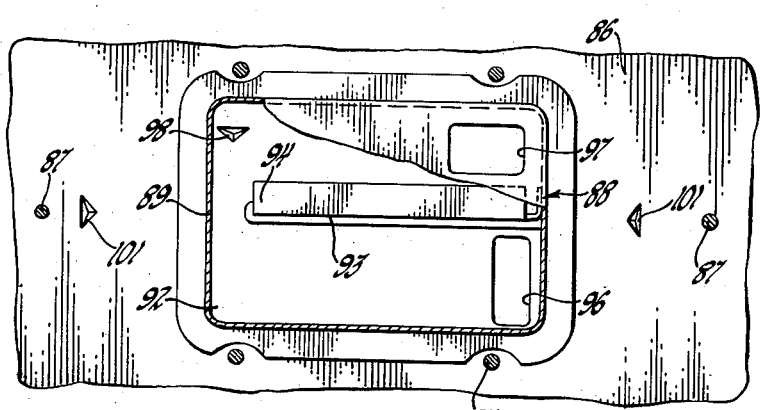
Figure 3 is an enlarged fragmentary view of the lubricating oil separating and collecting means embodied in the engine disclosed by the preceding figures.

The engine 10 has a crankcase 11 including crankcase members 12 and 13 that may be secured together by bolts 14 and 16. The bolts 14 extend through transverse end walls 17 and transverse intermediate walls 18 which enclose the ends of the crankcase compartment 19 and transversely divide the crankcase compartment into opposed cylinder compartments 21. The lower part of the crankcase 11 is enclosed by an oil pan 22 and the upper part by a cover 23. The transverse walls 17 and 18 are formed to provide crankshaft bearings 24 and camshaft bearings 26 which are adapted respectively to support the journals of the crankshaft 28 and the camshaft 29. The camshaft may be driven from the crankshaft by gears 31 and 32. Oppositely disposed rows of cylinders 36 may be secured in openings formed in the side walls 37 of the crankcase members 12 and 13, there being two of the cylinders 36 in communication with each of the compartments 21 of the crankcase 19. The cylinders 36 of each row of the cylinders may be closed at the outer ends by heads 38 which may be secured to the cylinders 36 and the cylinders 36 to the crankcase sections 12 and 13 by bolts 39.

If desired, the cylinders 36 may be separate cast iron cylinders having air cooling fins 41 formed thereon for cooling the cylinders. If desired, the heads 38 may be aluminum or other light metal heads also having fins 42 formed thereon for cooling the heads. The crankcase sections 12 and 13 and the cover 23 may, if desired, be formed of aluminum or other light metal capable of rapidly conducting heat from the cylinders 36. Since the cylinders 36 are air cooled cylinders it will be apparent that the cylinders will rapidly become heated and will rapidly heat the crankcase sections 12 and 13 and the cover 23.

The crankshaft 28 is driven by connecting rods 43 which connect the crankpins 44 of the crankshaft to pistons 46 that reciprocate in the cylinders 36. The cylinders have combustion chambers 47 controlled by valves 48 for the inlet and exhaust passages of the engine, the valves 48 having stems 49 mounted in valve guides 51 in the heads 38 for the cylinders of the engine. The valves 48 are normally held closed by springs 52 that are compressed between the heads 38 and spring washers 53 secured on the ends of the stems 49. The valves 48 are actuated by rocker arms 54 mounted on rocker arm supports 56 that are associated with certain of the bolts 39 that secure the heads and the cylinders to the crankcase. The rocker arms 54 are actuated by push rods 57 that are disposed in conduits 58 that are secured in openings in the heads 38 and the side walls 37 of the crankcase 11 and that connect valve actuating mechanism compartments 59 in the heads 38 to the crankcase compartment 19. The compartments 59 are formed by outer walls 60 of the heads 38 that are closed by rocker arm covers 65. The conduits 58 are sealed at the ends at 61 and 62 in the openings in the heads and crankcase that receive the ends of the conduits 58. Valve lifters 63 that extend between the inner ends of the push rods 57 and the cams 64 of the camshaft 29 are reciprocably supported in bosses 66 formed on the crankcase members 12 and 13. Spark plugs 67 ignite the charges in the combustion chambers 47 in timed relation to the operation of the valves 48 and the pistons 46.

A fuel pump 68 mounted in a socket in a housing 69 has a shaft 71 driven by cam 72 secured on an end of the crankshaft 28 that extends within a cavity 73 in a housing 74 which is bolted or otherwise secured to one of the end walls 17 of the crankcase 11 of the engine. The housing 69 is bolted or otherwise secured to the housing 74, the housing 74 forming an extension 76 beyond the cavity 73 in the housing 69 in which the fuel pump 68 is mounted. The extension 76 supports a guide 77 for the shaft 71 actuating the pump 68. A gear 78 secured on the end of the shaft 28 beyond the cam 72 is adapted to drive the oil pump and distributor of the engine. Secured on the end of the crankshaft 28 beyond the gear 78 is a pulley 79 for driving the fan or blower and the generator and other accessories of the engine 10. A fan is employed in a liquid cooled engine, a blower in an air cooled engine such as the engine 10. The cavity 73 is connected to the crankcase compartment 19 and is adapted to receive lubricating oil for lubricating the engine through an oil filler tube 81 secured in an opening in an upper part of the housing 69. The oil so supplied to the cavity 73 flows into the crankcase 19 where it is collected in the oil pan 22 of the engine. The oil for lubricating the engine is picked up by a pump inlet 81 which is normally submerged in the oil collected in the oil pan 22. The oil from the pump inlet 81 is supplied by a conduit 82 to the oil pump of the engine driven by the gear 81. The oil pump forms a part of the lubricating system of the engine which supplies oil to all of the moving parts of the engine through passages and conduits formed in the various parts of the engine.

The operation of the valves 48 and the pistons 46 causes vaporous substances to be collected in the rocker arm compartment 59 and in the crankcase compartment 19. Also the lubrication of the moving parts of the engine atomizes and sometimes vaporizes oil which collects in the compartments 59 and 19 and the cavity 73 and other interior spaces within the engine. All of such substances may be considered the vaporous substances resulting from the operation of the engine 10. The vaporous substances collected by the compartments 59 are adapted to flow to the crankcase compartment 19 through the conduits 58. Since the cavity 73 and other interior cavities in the engine also communicate with the crankcase compartment 19, the substances that collected in these cavities also will tend to flow into the crankcase compartment 19 of the engine.

It is proposed to collect all of these substances in a large cavity 83 formed in the cover 23. It is proposed to extend the cover 23 over the entire upper part of the crankcase 11 and to removably secure the cover 23 to the crankcase 11 by bolts 84 extending into the side walls 37 and end walls 17 of the crankcase 11. With such construction it will be apparent that the cavity 83 will be about as large in cross section as the crankcase 19. It is also proposed to extend the cavity 83 upwardly in the cover 23 so that the cavity will be much larger than is usual for separating chambers in conventional engines. It is proposed to separate the cavity 83 from the crankcase compartment 19 employing a baffle 86 that may be secured at the edges thereof to the cover 23 by pressed rivets 87. The baffle 86 therefore will be removable with the cover 23 when the bolts 84 are removed. In the central part of the baffle 86 it is proposed to construct an oil separator 88 which may consist of a housing 89 having the lower edges of the side walls thereof flanged at 91 and secured by welding or otherwise to the central part of the baffle 86. A separating chamber 92 within the separator 88 may be divided by a vertical baffle 93 having flanged edges 94 secured to the sides of the housing 89 and the baffle 86. The vertical baffle 93 is spaced from one of the walls of the housing 89 so that the chamber 92 will be formed by a sinuous passage extending between an inlet 96 in the baffle 86 and an outlet 97 in the upper part of the housing 89. The inlet 96 and the outlet 97 will be at opposite ends of the sinuous passage so that substances entering the inlet 96 will flow around the vertical baffle 93 to the outlet 97. It will be apparent that turning the corner around the end of the baffle 93 will apply centrifugal forces to the substances tending to cause any particles of oil contained in the substances to be thrown outwardly against the side walls of the housing 89 where the particles will flow by gravity onto the upper surface of the baffle 86 within the chamber 92. A louvered opening 98 formed in the baffle 86 and beyond the end of the vertical baffle 93 will cause such particles of oil to return to the crankcase 19 by gravity. The vaporous substances that flow outwardly of the chamber 92 through the outlet 97 will occupy a large settling chamber 99 formed in the cavity 83 above the baffle 86 and around the housing 89. The settling chamber being large in volume will cause the velocity of the substances in the settling chamber to be very low which in turn will cause futher settling of the vaporous substances on the baffle 86 around the housing 89. Such particles will thereupon flow by gravity to the crankcase compartment 19 through the louvered openings 101. Also, after the engine has been started and the parts have become heated, the cover 23 will tend somewhat to cool the vaporous substances in the settling chamber 99 which in turn will tend to condense and collect as particles of liquid on the walls of the cover and the surface of the baffle 86 and the housing 89. The collected particles also flow into the crankcase compartment 19 through the louvered openings 101. A tube 102 connected to the settling chamber 99 at one side of the cover 23 will exhaust the remaining substances from the settling chamber 99 to the atmosphere surrounding the engine.

The substances so collected in the cavity 83 may be caused to circulate and to exhaust through the exhaust tube 102 in any desired manner. However, in an air cooled engine it will be possible to cause such circulation without objectionable condensation on the walls of the crankcase and without admitting air to the crankcase of the engine. Ordinarily such air is admitted through the oil filler tube indicated at 81. In the present instance however, it is proposed to provide a cap 103 for the filler tube 81 which may be of bayonet slot construction so that it may be removed from the tube 81 for filling the engine with oil. However, when tightened on the tube 81 it is proposed to practically seal the tube against the admission of air or the exhaust or vaporous substances which may otherwise occur. For this purpose the cap is provided with an inner spring plate 104, the central part of which may engage a depression 106 in the cover, the edges being adapted to engage a plastic disk 107 to press the edges of the disk against the upper end of the tube 81. When the cap is tightened the disk 107 will substantially prevent leakage in either direction through the tube 81. However, the vaporous substances in the engine will not tend to condense on the walls of the crankcase and other parts of the engine when the engine is started. This will be prevented by the separator 88 and the settling chamber 99 and by the air cooled construction of the engine which may embody the cast iron cylinders 36, the aluminum or other light metal heads 38, crankcase 11 and cover 23.

It is also proposed to provide a blower 108 which may be driven by a belt from the pulley 79. The blower will discharge air on the light metal cover 23 for cooling the light metal cover 23 so that after the engine has been heated to normal operating temperature the cover 23 will extend to condense the vaporous substances in the settling chamber 99.

The air cooling of the engine and the high heat conductivity of the various walls with which the substances may come in contact will cause the engine to heat rapidly during the starting of the engine. This tendency to heat rapidly will prevent condensation of the vaporous substances on the walls of the crankcase compartment 19, the rocker arm compartments 59 and other cavities of the engine. The substances therefore will flow into the separator 89 and thence to the separating chamber 99 as a result of the internal pressure that will result from starting the engine. Internal pressure in the engine therefore will cause the vaporous substances to flow through the inlet 96, the sinuous cavity 92, the outlet 97, settling chamber 99 and toward the exhaust tube 102.

I claim:

1. A venting system for an internal combustion engine having inner compartments subject to the collection of vaporous substances and comprising, a crankcase having an open top and having cylinders opening inwardly from the sides thereof, said cylinders having reciprocating pistons and valves adapted to leak said substances into said crankcase, said cylinders being air cooled cylinders and said crankcase being an aluminum or other highly heat conductive metal crankcase, said air cooled cylinders being adapted to heat rapidly after starting said engine and said crankcase being adapted rapidly to conduct heat from said cylinders and to heat rapidly and to avoid condensing said vapors when said engine is started, a cover for said open top of said crankcase, an outlet formed in said cover and leading from said crankcase and adapted to exhaust said vaporous substances from said crankcase to the atmosphere, oil separating means formed in said cover and adapted to separate oil from said vaporous substances and to return said oil to said crankcase, inlet means communicating with said crankcase and adapted to be employed in filling said crankcase with oil, a removable cap for closing said inlet means, and sealing means in said cap and substantially sealing said cap against the flow of air inwardly or the flow of said vaporous substances outwardly of said inlet means.

2. A venting system for an internal combustion engine having inner compartments subject to the collection of vaporous substances and comprising, a crankcase having an open top and having cylinders opening inwardly from the sides thereof, said cylinders having reciprocating pistons and valves adapted to leak said substances into said crankcase, said cylinders being air cooled cylinders and said crankcase being an aluminum or other highly heat conductive metal crankcase, said air cooled cylinders being adapted to heat rapidly after starting said engine and said crankcase being adapted rapidly to conduct heat from said cylinders and to heat rapidly and to avoid condensing said vapors when said engine is started, a cover for said open top of said crankcase, said cover being formed to provide an upwardly extending cavity substantially extending the greater part of the compartment within said crankcase upwardly into said cover, an outlet formed in the upper part of said cover and leading from said cavity and adapted to exhaust said vaporous substances from said crankcase through said cavity and to the atmosphere, a baffle extending across the lower part of said cover and separating said cavity from said crankcase, oil separating means formed in said baffle and adapted to separate oil from said vaporous substances, said separating means being formed at the central part of said baffle and extending upwardly within said cavity but being spaced from the walls of said cover to provide a settling chamber around said separating means, oil return means formed in said baffle and draining oil from said separating means and said settling chamber to said crankcase, inlet means communicating with said crankcase and adapted to be employed in filling said crankcase with oil, a removable cap for closing said inlet means, and sealing means in said cap and substantially sealing said cap against the flow of air inwardly or the flow of said vaporous substances outwardly of said inlet means.

3. A venting system for an internal combustion engine having inner compartments subject to the collection of vaporous substances and comprising, a crankcase having an open top and having cylinders opening inwardly from the sides thereof, said cylinders having reciprocating pistons and valves adapted to leak said substances into said crankcase, said cylinders being air cooled cylinders and said crankcase being an aluminum or other highly heat conductive metal crankcase, said air cooled cylinders being adapted to heat rapidly after starting said engine and said crankcase being adapted rapidly to conduct heat from said cylinders and to heat rapidly and to avoid condensing said vapors when said engine is started, a cover for said open top of said crankcase, said cover being formed to provide an upwardly extending cavity substantially extending the greater part of the compartment within said crankcase upwardly into said cover, an outlet formed in the upper part of said cover and leading from said cavity and adapted to exhaust said vaporous substances from said crankcase through said cavity and to the atmosphere, a baffle extending across the lower part of said cover and separating said cavity from said crankcase, oil separating means formed in said baffle and adapted to separate oil from said vaporous substances, said separating means being formed at the central part of said baffle and extending upwardly within said cavity but being spaced from the walls of said cover to provide a settling chamber around said separating means, oil return means formed in said baffle and draining oil from said separating means and said settling chamber to said crankcase, inlet means communicating with said crankcase and adapted to be employed in filling said crankcase with oil, a removable cap for closing said inlet means, and sealing means in said cap and substantially sealing said cap against the flow of air inwardly or the flow of said vaporous substances outwardly of said inlet means, means securing said baffle and said separating means to said cover, and means removably securing said cover and baffle and separating means to said crankcase.

4. A venting system for an internal combustion engine having inner compartments subject to the collection of vaporous substances and comprising, a crankcase having an open top and having cylinders opening inwardly from the sides thereof, said cylinders having reciprocating pistons and valves adapted to leak said substances into said crankcase, a cover for said open top of said crankcase, said cover being formed to provide an upwardly extending cavity substantially extending the greater part of the compartment within said crankcase upwardly into said cover, an outlet formed in the upper part of said cover and leading from said cavity and adapted to exhaust said vaporous substances from said crankcase through said cavity and to the atmosphere, a baffle extending across the lower part of said cover and separating said cavity from said crankcase, oil separating means formed in said baffle and adapted to separate oil from said vaporous substances, said separating means being formed at the central part of said baffle and extending upwardly within said cavity but being spaced from the walls of said cover to provide a settling chamber around said separating means, oil return means formed in said baffle and draining oil from said separating means and said settling chamber to said crankcase, and inlet means communicating with said crankcase and adapted to be employed in filling said crankcase with oil.

5. A venting system for an internal combustion engine having inner compartments subject to the collection of vaporous substances and comprising, a crankcase having an open top and having cylinders opening inwardly from the sides thereof, said cylinders having reciprocating pistons and valves adapted to leak said substances into said crankcase, a cover for said open top of said crankcase, said cover being formed to provide an upwardly extending cavity substantially extending the greater part of the compartment within said crankcase upwardly into said cover, an outlet formed in the upper part of said cover and leading from said cavity and adapted to exhaust said vaporous substances from said crankcase through said cavity and to the atmosphere, a baffle extending across the lower part of said cover and separating said cavity from said crankcase, oil separating means formed in said baffle and adapted to separate oil from said vaporous substances, said separating means being formed at the central part of said baffle and extending upwardly within said cavity but being spaced from the walls of said cover to provide a settling chamber around said separating means, oil return means formed in said baffle and draining oil from said separating means and said settling chamber to said crankcase, inlet means communicating with said crankcase and adapted to be employed in filling said crankcase with oil, means securing said baffle and said separating means to said cover, and means removably securing said cover and baffle and separating means to said crankcase.

References Cited in the file of this patent
UNITED STATES PATENTS
2,771,064    Burrell _____ Nov. 20, 1956